(12) United States Patent
Shui et al.

(10) Patent No.: US 8,190,858 B2
(45) Date of Patent: May 29, 2012

(54) INTERFACE DEVICE FOR INTERFACING A MAIN PROCESSOR TO PROCESSING ENGINES AND CLASSIFIER ENGINES, AND METHODS FOR CONFIGURING AND OPERATING INTERFACE DEVICES

(75) Inventors: Yaxin Shui, San Diego, CA (US); Phil Terry, Simi Valley, CA (US); Kevin Robertson, San Diego, CA (US); Quang Hong, San Diego, CA (US); Bao K. Vuong, San Diego, CA (US)

(73) Assignee: Topside Research, LLC, Williamsburg, VA (US)

( * ) Notice: Subject to any disclaimer, the term of this patent is extended or adjusted under 35 U.S.C. 154(b) by 2767 days.

(21) Appl. No.: 10/374,147

(22) Filed: Feb. 25, 2003

(65) Prior Publication Data
US 2004/0168041 A1    Aug. 26, 2004

(51) Int. Cl.
*G06F 15/76* (2006.01)
(52) U.S. Cl. ............... 712/34; 712/33; 712/38
(58) Field of Classification Search .......... 712/34, 712/33, 38; 709/305, 306, 307
See application file for complete search history.

(56) References Cited

U.S. PATENT DOCUMENTS

| 4,330,824 A | 5/1982 | Girard |
| 4,394,725 A | 7/1983 | Bienvenu |
| 4,740,954 A | 4/1988 | Cotton |
| 5,021,991 A * | 6/1991 | MacGregor et al. .......... 710/305 |
| 5,361,373 A * | 11/1994 | Gilson .............................. 712/1 |
| 5,649,149 A | 7/1997 | Stormon et al. |
| 5,684,980 A * | 11/1997 | Casselman ...................... 703/23 |
| 5,737,631 A * | 4/1998 | Trimberger ..................... 712/37 |
| 5,794,062 A * | 8/1998 | Baxter ............................ 712/30 |
| 5,815,715 A * | 9/1998 | Ku.cedilla.uk.cedilla.akar ............... 717/141 |
| 5,841,874 A | 11/1998 | Kempke et al. |
| 5,860,085 A | 1/1999 | Stormon et al. |
| 5,898,689 A | 4/1999 | Kumar et al. |
| 5,923,893 A | 7/1999 | Moyer et al. |
| 5,961,626 A | 10/1999 | Harrison et al. |
| 5,982,749 A | 11/1999 | Daniel |
| 6,067,408 A | 5/2000 | Runaldue |
| 6,138,185 A | 10/2000 | Nelson |
| 6,288,922 B1 | 9/2001 | Wong |
| 6,292,878 B1 | 9/2001 | Morioka |
| 6,308,255 B1 * | 10/2001 | Gorishek et al. ............... 712/209 |
| 6,308,311 B1 * | 10/2001 | Carmichael et al. ........... 716/16 |
| 6,389,489 B1 | 5/2002 | Stone |
| 6,417,691 B1 * | 7/2002 | Goodman et al. .............. 326/41 |

(Continued)

OTHER PUBLICATIONS

DeHon, Andre, Transit Note #118 Notes on Coupling Processors with Reconfigurable Logic, Mar. 1995, pp. 1-40.*

(Continued)

*Primary Examiner* — Aimee Li
(74) *Attorney, Agent, or Firm* — SoCal IP Law Group LLP; Steven C. Sereboff; M. Kala Sarvaiya

(57) ABSTRACT

There is disclosed an interface device for interfacing between a main processor and one or more processing engines. The interface device is configurable, so that it may be used with a wide range of processing engines without being redesigned.

44 Claims, 5 Drawing Sheets

U.S. PATENT DOCUMENTS

| | | | |
|---|---|---|---|
| 6,425,077 B1 * | 7/2002 | Le et al. | 713/1 |
| 6,442,674 B1 | 8/2002 | Lee et al. | |
| 6,480,952 B2 * | 11/2002 | Gorishek et al. | 712/227 |
| 6,496,922 B1 * | 12/2002 | Borrill | 712/209 |
| 6,658,503 B1 | 12/2003 | Agarwala | |
| 6,687,768 B2 | 2/2004 | Horikomi | |
| 6,735,219 B1 | 5/2004 | Clauberg | |
| 6,754,804 B1 * | 6/2004 | Hudepohl et al. | 712/34 |
| 6,795,870 B1 | 9/2004 | Bass | |
| 6,862,655 B1 | 3/2005 | Podaima | |
| 7,080,190 B2 | 7/2006 | Weber | |
| 2001/0037435 A1 | 11/2001 | Van Doren | |
| 2002/0061022 A1 | 5/2002 | Allen | |
| 2002/0099855 A1 | 7/2002 | Bass | |
| 2004/0230735 A1 | 11/2004 | Moll | |

OTHER PUBLICATIONS

PetaSwitch Solutions, Inc., The Pisces Chipset, Product Brief, 2001, http://www.peta-switch.com/products/product_brief.htm.

PetaSwitch Solutions, Inc., PetaSwitch Solutions Announces Raising $4 Million in First Round Financing, Press Release, 2001, http://peta-switch.com/newsroom/press_releases.htm.

PetaSwitch Solutions, Inc., Company Overview, 2001, http://www.peta-switch.com/markets/overview.htm.

Music Semiconductors, Extending the LANCAM Comparand, Application Brief (AB-N3), Sep. 30, 1998.

Rabaey, Fall 2000 Term Project Phase 1, Univeristy of California, College of Engineering.

* cited by examiner

INTERFACE DEVICE FOR INTERFACING A MAIN PROCESSOR TO PROCESSING ENGINES AND CLASSIFIER ENGINES, AND METHODS FOR CONFIGURING AND OPERATING INTERFACE DEVICES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to interfaces between processors.

2. Description of Related Art

The time required to find an item stored in a memory can be reduced considerably if stored data can be identified for access by the content of the data itself rather than by an address. A memory unit accessed by content is called a content addressable memory (CAM) or associative memory. Binary CAM architectures store 1 and 0 data. Ternary CAM architectures store 1, 0, and don't care "x" data.

CAMs are well known. They can be accessed simultaneously and in parallel on the basis of data content rather than by specific address or location. When a word is written in a CAM, no address is given. The CAM is capable of finding an empty unused location to store the word. When a word is to be read from a CAM, the content of the word, or part of the word, is specified. The CAM locates all words which match the specified content and marks them for reading. If the specified content (the "compared") is found in multiple locations, the CAM may "prioritize" the result and return the "highest" value (often defined as the lowest address).

Because of its organization, the CAM is well suited to do parallel searches by data association. A CAM is typically more expensive than a RAM because each cell must have storage capacity as well as logic circuits for matching its contents with an external argument. For this reason, CAMs are often used in applications where the search time is critical and must be short.

Telecommunications applications often have time-critical searches and therefore have been considered well-suited for CAMs. In telecommunications, the process of identifying traffic elements (e.g., frames, packets, and cells) is known as "classification." Specific applications dictate the required degree of differentiation of traffic elements and the criteria by which they are distinguished. Classification at fine granularity for large numbers of traffic flows at wire-speed is a problem space typically requiring hardware-based solutions. However, because of the application dependence, typical hardware solutions have been inflexible.

DESCRIPTION OF THE DRAWINGS

The present invention will be described by way of exemplary embodiments, but not limitations, illustrated in the accompanying drawings in which like references denote similar elements.

DETAILED DESCRIPTION OF THE INVENTION

Throughout this description, the embodiments and examples shown should be considered as exemplars, rather than limitations on the apparatus and methods of the present invention.

The System of the Invention

Figure 1:
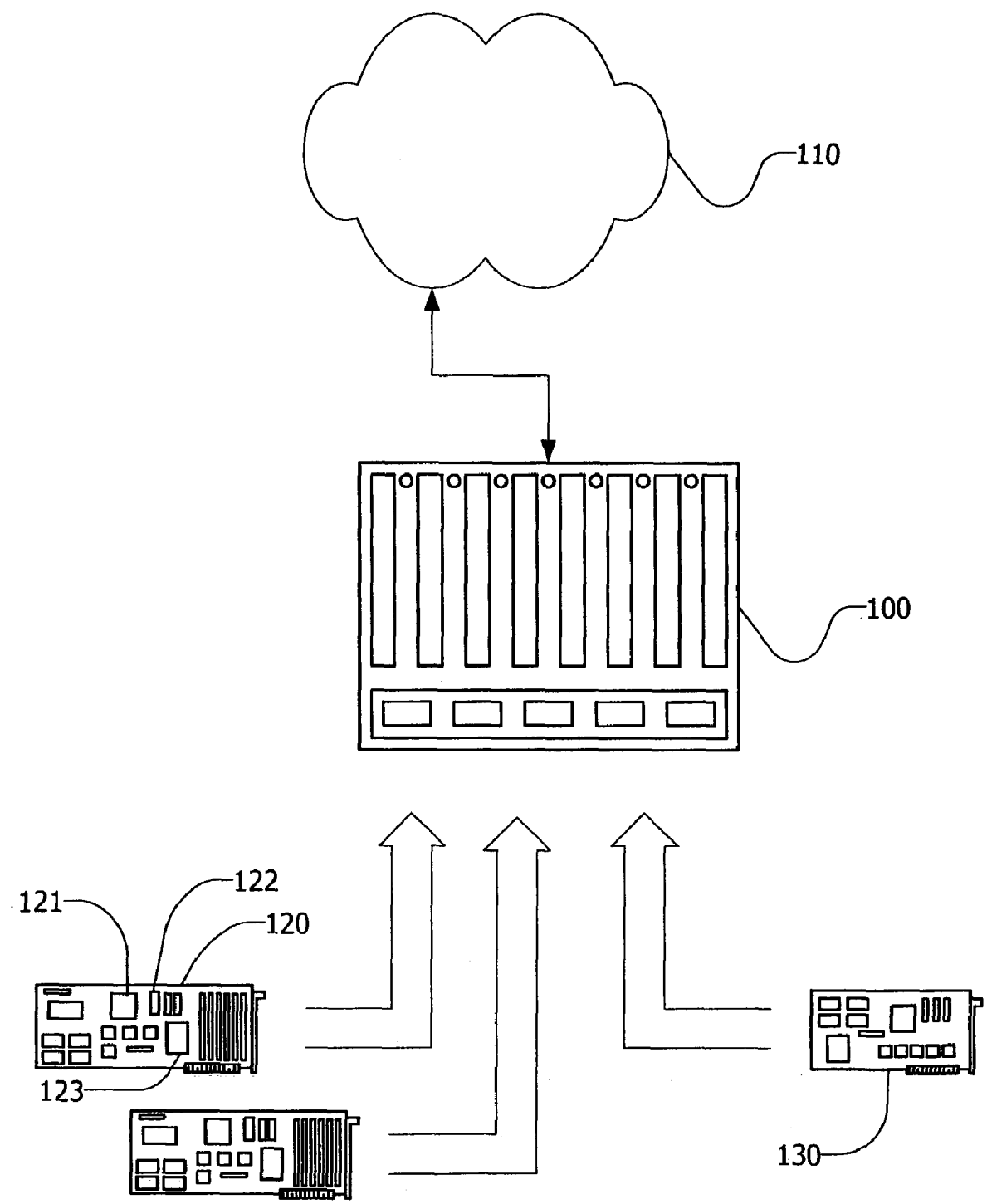
FIG. 1 is a diagram of a network in accordance with the invention.

Referring now to FIG. 1, there is shown a diagram of a network in accordance with the invention. The network includes a network cloud 110 and a network device 100. The network cloud 110 may be a data communications network (e.g., LAN, WAN, MAN), a storage area network (SAN), a voice communications network, or other network. The network device 100 may be, for example, a switch, a hub, a frame relay device, a multiplexer or a router.

The network device 100 may be a chassis, a stackable unit, a fully integrated unit, or a component of another device. Housed within the network device 100 are a plurality of line cards 120 and a switch fabric card 130. The line cards 120 and the switch fabric card 130 may be removable from the network device 100 or fixed within the network device 100. There may be one or more line cards 120, and the line card 120 may be integrated with the switch fabric card 130. The line card 120 may comprise one or more integrated circuits (ICs), including a main processor IC 121, a host processor IC 122 and a processing engine IC 123. The main processor IC 121 may be, for example, a network processor IC.

Integrated circuits such as the main processor IC 121, the host processor IC 122 and the processing engine IC 123 typically have a bus width, a pin map and a clock rate. ICs typically communicate via a bus with other devices, including other ICs. The bus may have an instruction portion and a data portion, or an operation code portion and an operand portion. By "bus width" it is meant a total number of signal lines which make up a bus. For example, a bus with 32 signal lines has a width of 32. Of those 32 signal lines, some may be used exclusively for operation codes or instructions, and others may be used exclusively for operands or data. The "pin map" is what identifies the purpose of each of the signal lines in a bus. The "clock rate" is the signaling format for the bus. For most buses, all of the signal lines are operated according to the same clock, although it is possible for a bus to have multiple clock rates.

Figure 2:
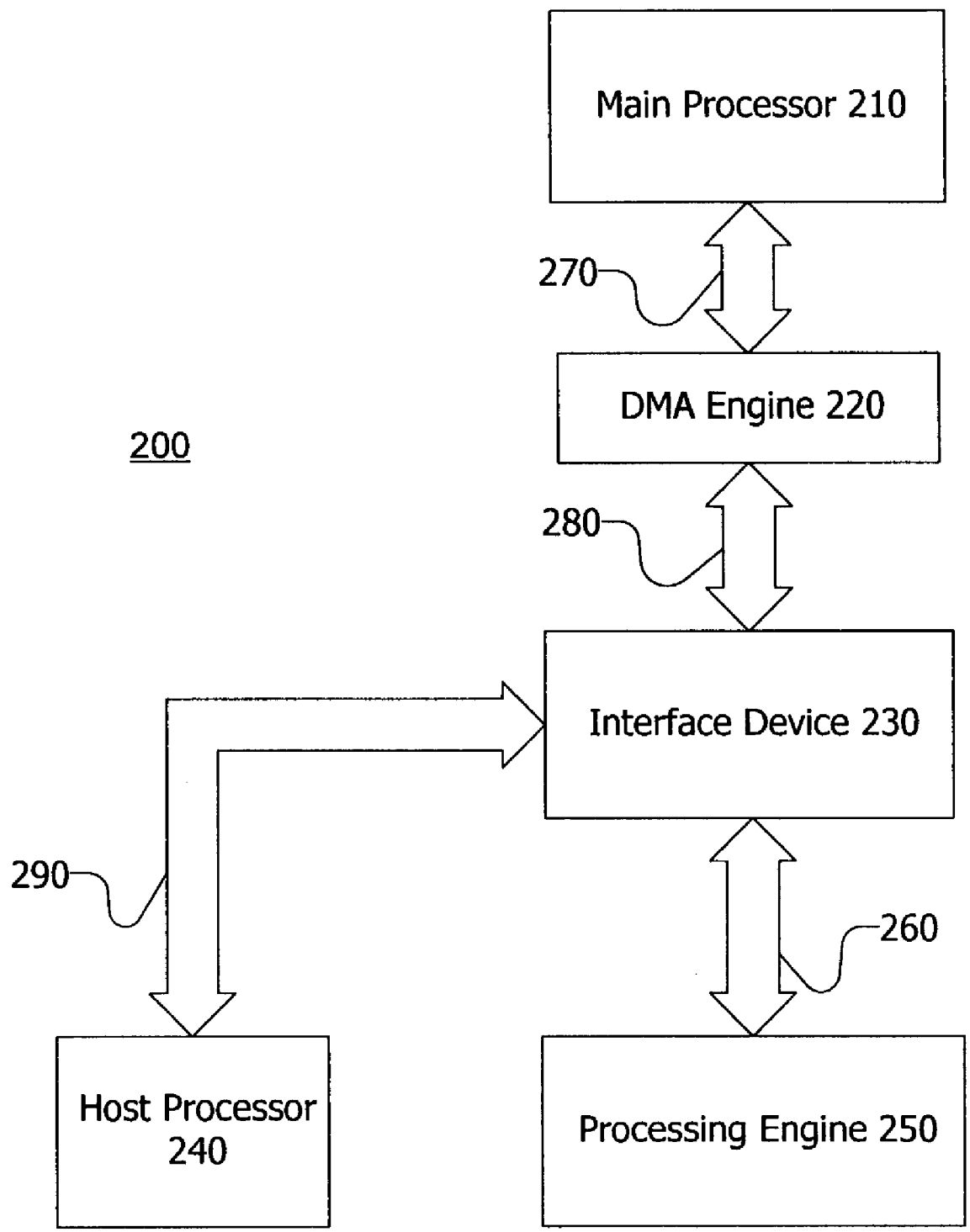
FIG. 2 is a block diagram of a line card in accordance with the invention.

Referring now to FIG. 2, there is shown a block diagram of a line card 200 in accordance with the invention. The line card 200 may include a main processor 210, a direct memory access (DMA) engine 220, an interface device 230, a host processor 240 and a processing engine 250. The interface device 230 is coupled to the DMA engine 220 via a main bus 280. The main bus 280 has a fixed width, pin map and clock rate. The DMA engine 220 is coupled to the main processor 210 via bus 270. The main bus 280 and the bus 270 may be the same bus. The main processor 210 may be coupled directly to the interface device 230 via the main bus 280, for example if the DMA engine 220 is omitted. The interface device 230 is coupled to the processing engine 250 via a processing engine bus 260. The host processor 290 is coupled to the interface device 230 via a host bus 290.

The purpose of the interface device 230 is to receive messages from the main processor 210 and send operation codes and operands based upon the messages to the processing engine 250. The messages comprise instruction portions and data portions. The main processor 210 may comprise multiple processors, such as parallel processors, each of which can simultaneously send a message to the interface device 230.

At the time of the design of the interface device 230, the main processor 210 has a message set and message format which are substantially fixed. Likewise, the main bus 280 has a pin map and clock rate which are substantially fixed. In contrast, at the time of the design of the interface device 230, the processing engine 250 may be unknown, so the processing engine 250 may have an operation code set and operand format which are unknown. Likewise, the pin map and clock rate needed to communicate with the processing engine 250 may be unknown. The interface device 230 is therefore configurable to accommodate a virtually limitless number of processing engine types. The processing engine bus 260 can be seen to have a variable pin map and variable clock rate, determined by the choice of processing engine.

As with the main processor 210, the host processor 240 has a message set and message format which are substantially fixed. Likewise, the host bus 290 has a pin map and clock rate which are substantially fixed.

The line card 200 may further comprise additional processing engines having respective buses coupled to the interface device 230 in the manner of the processing engine 250 and processing engine bus 260.

The processing engine 250 may be selected from a variety of devices. The processing engine 250 may be a special purpose device, such as a classifier engine, a co-processor, Field Programmable Gate Array (FPGA) or other programmable logic device, or a memory. The processing engine 250 may alternatively be a general purpose processing device, such as another network processor. Where multiple processing engines are desired, it will be seen that the interface device can accommodate different types of processing engines, even types that are very different.

A "classifier engine" is an instruction-responsive device which compares input data to one or more parameters. For example, a classifier engine may act as an abstract filter to identify locations in input data where potential string matches may exist. Classifier engines may comprise a single high speed and high density classifier engine, plural identical classifier engines, plural non-identical classifier engines, a classifier engine which receives its instructions through its data bus, a classifier engine which receives its operations code separate through its message data, a streaming pipelined memory, a context memory, a CAM, a ternary CAM, or a CAM with context SRAM.

The line card of FIG. 2 may be embodied as a single IC, or the blocks in FIG. 2 may be embodied as one or more separate ICs. For example, the main processor 210, the DMA engine 220, the interface device 230, the bus 270 and the main bus 280 may be on the same IC. The components of the interface device 230 may be formed of integrated circuits, and may be operated in accordance to microcode or other operating messages.

Figure 3:
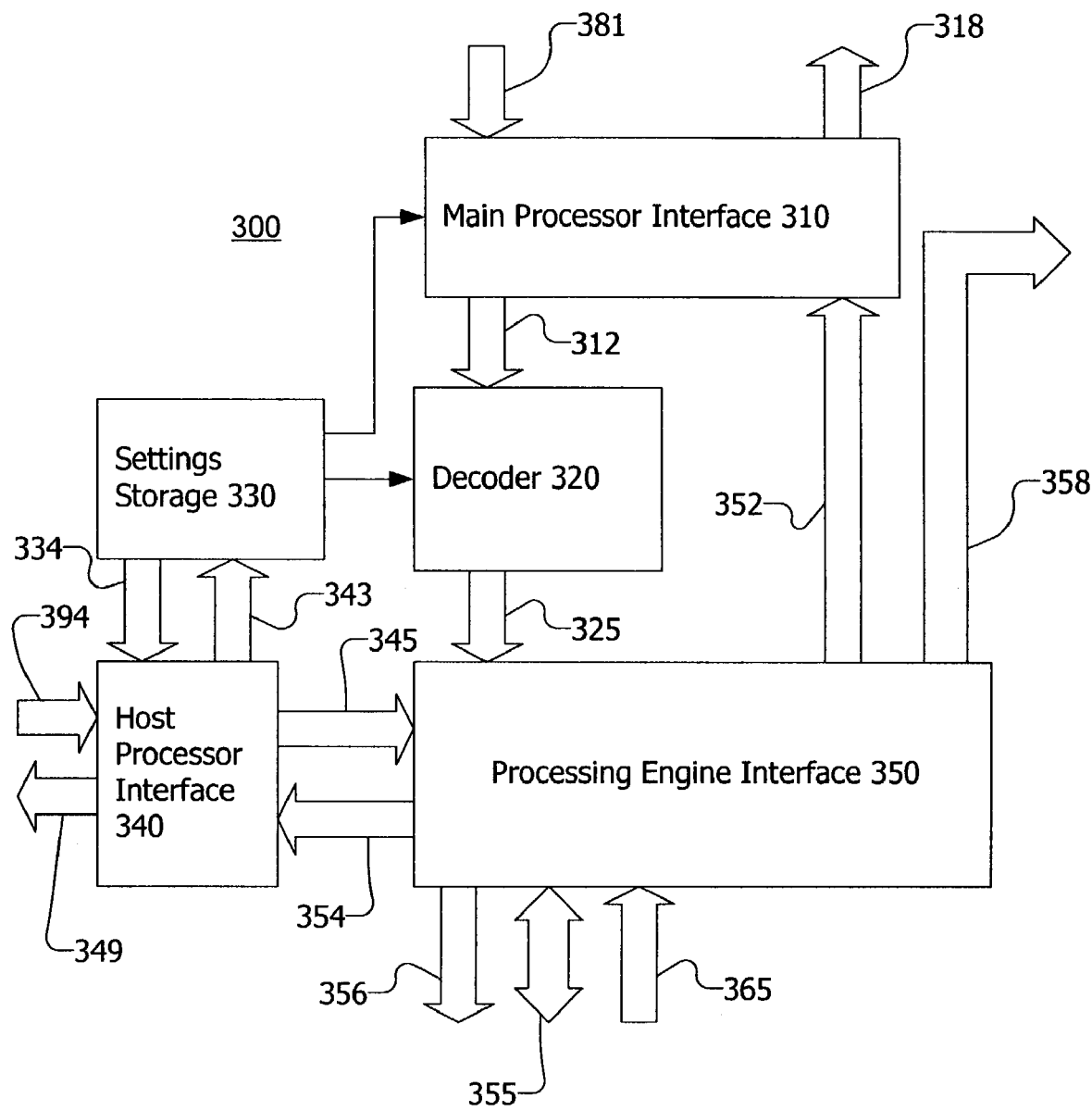
FIG. 3 is a functional block diagram of a first interface device in accordance with the invention.

Referring now to FIG. 3, there is shown a functional block diagram of an interface device 300. The interface device 300 includes a main processor interface 310, a decoder 320, a processing engine interface 350 and settings storage 330. The settings storage 330 is coupled to the decoder 320 and the main processor interface 310. If there is a host processor 240, the interface device 300 may also include a host processor interface 340.

The settings storage 330 is for storing variables of the processing engine. The variables of the processing engine may include a translation of instructions into an operation code set of the processing engine, a conversion of operands into a format of the processing engine, a pin map of the processing engine and a clock rate of the processing engine. In addition, the settings storage 330 may store search and result latencies, a parity-check option for error correction, a hardware reset hold time, and other characteristics of the processing engine, all of which may be used by the interface device 300. The settings storage 330 may be a plurality of registers, a memory or other storage.

The main processor interface 310 has a pipe 381 coupled to the main bus for receiving messages via the main bus from the main processor directed at the processing engine. The main processor interface 310 also has a pipe 318 coupled to the main bus for sending data via the main bus to the main processor, such as results from the processing engine.

The decoder 320 processes the messages from the main processor 210 into a format acceptable to the processing engine. Via pipe 312, the decoder 320 receives the messages from the main processor interface 310. The decoder 320 separates received messages into an instruction and an operand. The decoder 320 translates the instruction to the operation code set of the processing engine. The decoder 320 converts the operand to the format of the processing engine. Via pipe 325, the decoder 320 passes the operation codes and operands to the processing engine interface 350.

Depending on the type of processing engine, decoder 320 may perform differently. For example, if the processing engine is a CAM, then the operand may be converted into a comparand and a result location. A CAM is a special type of memory that is often used for performing address searches. A comparand register, also known as a "comparand", is a component of the CAM which aids in retrieving information stored in the CAM. The comparand stores information on data being searched for in the CAM. The data in the CAM is then compared to the information in the comparand to locate the data being searched for in the CAM. In addition, the instruction may indicate some processing to be performed by the interface device 300 prior to or following processing by the processing engine.

The processing engine interface 350 has pipes 355, 356 coupled to the processing engine bus for sending translated operation codes and converted operands via the processing engine bus to the processing engine. The processing engine interface 350 may also include logic for controlling the flow of messages to the processing engines. The pipes 355,356 of the processing engine interface 350 communicate with the processing engine bus in conformance with the processing engine pin map and the processing engine clock rate. The pipe 356 may be used for instructions and the pipe 355 may be used for operands. A result pipe 365 may be provided for receiving results from the processing engine, for example if the processing engine is a CAM.

The pipes 355, 356, 365 altogether may use a predefined number of signal lines and predefined pins on an IC. Through the configuration described herein, the use of the signal lines and pins may be established and changed through software.

Data from the processing engine may be passed from the processing engine interface 350 via pipe 352 to the main processor interface 310. The main processor interface 310 may pass the data to the main bus via pipe 318. The processing engine interface 350 may also pass data from the processing engine to other devices via pipe 358.

The decoder 320 may also configure the processing engine interface 350 for proper communication with the processing engine. The decoder 320 may configure the processing engine interface 350 to use the processing engine bus in conformance with the processing engine pin map and the processing engine clock rate, both of which may be stored in the settings storage 330.

The settings of the processing engine may be loaded into the settings storage 330 in a number of ways. For example, the settings may be loaded into the settings storage 330 by the host processor. In this alternative, the host processor interface 340 may include pipes 334, 343 coupled to the settings storage 330, and pipes 349, 394 coupled to the host bus for communicating with the host processor. The host processor may therefore be used to store the settings of the processing engine in the settings storage 330. It will be appreciated that some settings may be included in messages from the main processor 210.

Another benefit of the host processor interface 340 is that the host processor may thereby be used to configure the processing engine. Configuration messages from the host processor enter the host processor interface 340 from the host bus via the pipe 394 of the host processor interface 340. The host processor interface 340 sends the configuration messages via pipe 345 to the processing engine interface 350. The processing engine interface 350 sends the configuration messages to the processing engine, and may return data from the processing engine received via pipes 355 or 365 to the host processor interface 340 via pipe 354. The host processor interface 340 may return the data from the processing engine to the host processor via pipe 349. In this way, the host processor may be used to initialize, maintain and debug the processing engine. The host processor interface 340 may include logic for mapping host processor messages to processing engine messages. Alternatively, host processor messages may be "pre-decoded."

It can be seen that the interface device 300 has two paths to the processing engine bus. First, there is a fast path from the main bus to the processing engine bus. Second, there is a slow path from the host interface bus to the processing engine bus. However, it may be desirable in some situations to give priority to the slow path over the fast path. Where the interface device 300 is included in a network processor, it may be desirable to make the fast path as fast as possible, whereas there may be little concern for the speed of the slow path.

To accommodate differences between the data rate of the host bus and the processing engine, the host processor interface 340 may include rate buffers for buffering data passing between the host bus and the processing engine.

Figure 4:
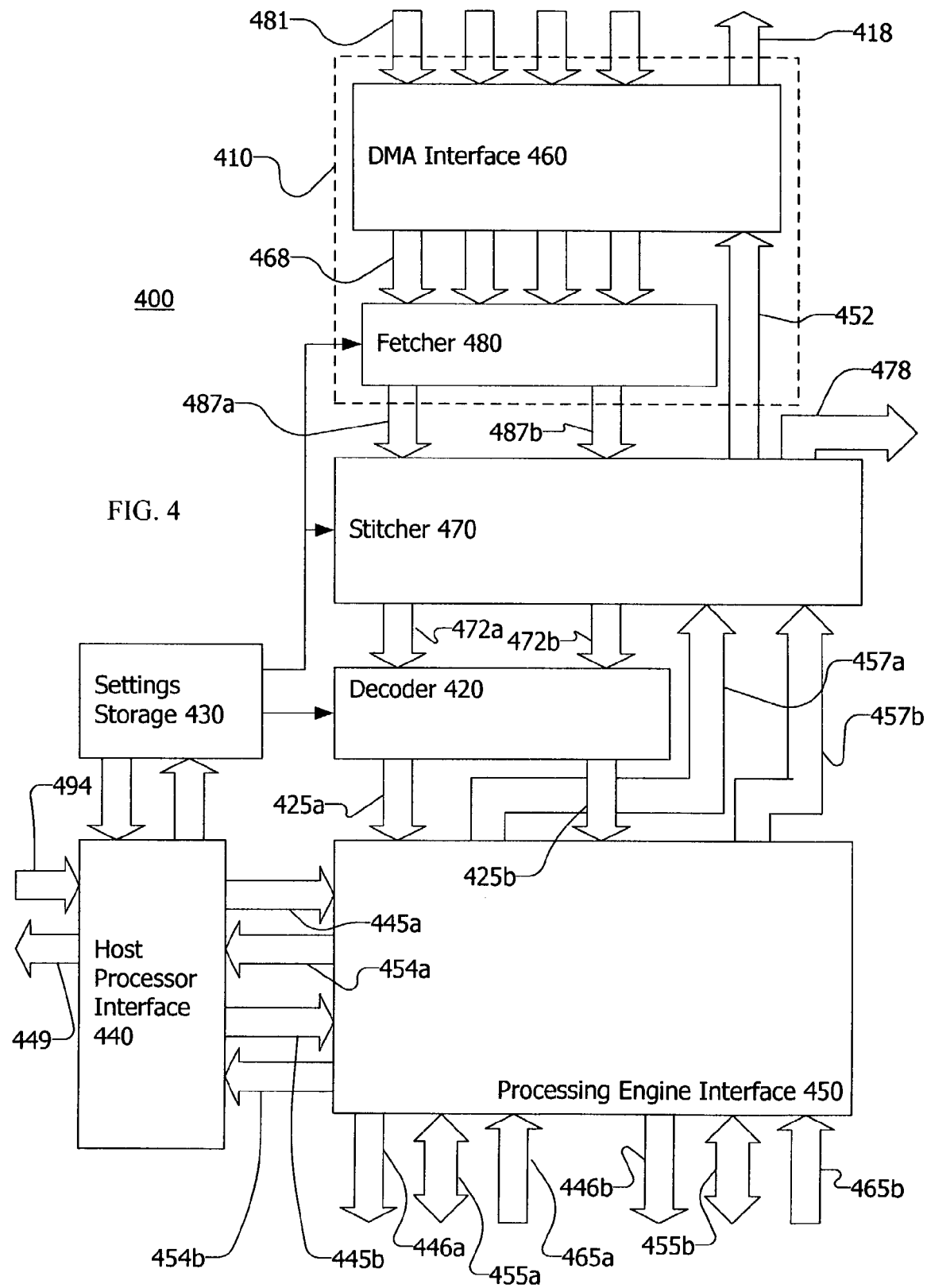
FIG. 4 is a block diagram of a second interface device in accordance with the invention.

Referring now to FIG. 4, there is shown a block diagram of an interface device 400 in accordance with the invention. The interface device 400 of FIG. 4 has several differences from the interface device 300 of FIG. 3. In FIG. 4, the interface device 400 includes a stitcher 470, and may be used with two processing engines. In addition, the main processor interface 410 includes a DMA interface 460 and a fetcher 480. The DMA interface 460 and fetcher 480 may support pipelining of messages to further increase effective throughput of the interface device and the processing engines.

The DMA interface 460 is provided to increase the rate by which the main processor interface 410 may receive messages from the main bus. Rather than just one pipe 381 as in FIG. 3, the DMA interface 460 has a plurality of pipes 481 to the main bus. For buffering the incoming messages, the DMA interface 460 may further comprise a high speed memory, such as plurality of first-in, first-out memories (FIFOs), and an arbiter. The arbiter directs messages from the pipes 481 to the FIFOs. This may be performed on a round-robin basis, a modified round-robin basis, based upon availability in the FIFOs for more messages, or otherwise. The FIFOs receive messages from the DMA engine (FIG. 2) through the pipes 481. The FIFOs may be matched one-to-one to the pipes 481, so that there are an equal number of pipes and FIFOs.

The fetcher 480 is provided to fetch messages from the DMA interface 460 through pipes 468, and to separate messages into instructions and operands. The fetcher 480 may comprise a plurality of register files and a controller for extracting the instructions and operands from the messages in the register files.

The stitcher 470 may schedule decoding of messages and transmissions to the processing engines. Some messages may be passed directly to the decoder 420, while other messages may be held or stored temporarily in a wait memory. In a process which will be referred to as "stitching," the stitcher 470 may prepend results from the processing engines to messaes in the wait memory. The stitcher 470 may give a higher priority to stitched messages. The stitcher 470 may decide which messages to pass directly and which to hold based upon information in the messages.

In other respects, the interface device 400 is similar to the interface device 300. The decoder 420, settings storage 430, host processor interface 440 and processing engine interface 450 are similar to the same components of the interface device 300 of FIG. 3. As mentioned, the interface device 400 supports two processing engines. As can be seen, the interface device 400 may support any number of processing engines by creating a corresponding number of parallel processing components within the main processor interface 410, the stitcher 470, the decoder 420, the settings storage 430 and the processing engine interface 450.

The interface device 400 also has parallel pipes. These parallel pipes include pipes 487a, 487b from the fetcher 480 (or main processor interface 410) and the stitcher 470; pipes 472a, 472b from the stitcher 470 to the decoder 420; pipes 425a, 425b from decoder 420 to processing engine interface 450; pipes 446a, 446b for carrying operation codes from the processing engine interface 450 to the processing engine bus; pipes 455a, 455b for communicating data between the processing engine interface 450 and the processing engine bus; pipes 465a, 465b for passing results from the processing engine bus to the processing engine interface 450; and pipes 457a, 457b for passing results from the processing engine interface 450 to the stitcher 470.

The host processor interface 440 also may be adapted to support multiple processing engines. To accommodate this, the host processor interface may have parallel pipes 445a, 445b to the processing engine interface 450; and pipes 454a, 454b from the processing engine interface 450. Alternatively, there may be a single bus between the host processor interface 440 and the processing engine interface 450. In such an embodiment, the bus protocol may have control signals that distinguish data from/to the different processing engines.

The parallel architecture of the integrated device 400 may allow the interface device 400 to interface to the processing engines independently and in parallel. Thus, while one processing engine is being configured, the other processing engine may process messages.

In addition, the interface device 400 may be programmed to select a less-busy processing engine for receiving a given message. This selectivity may be particularly useful amongst plural identical processing engines. In this way, throughput may be increased since the parallel fast paths can be used to service both processing engines.

In one embodiment, one processing engine is a CAM and a second processing engine is an SRAM. The CAM is connected to the SRAM, and the results of the CAM are used as the address lines to the SRAM. The SRAM retrieves its data and presents it back to the main processor as the CAM result. This allows for further indirection, and thus flexibility, in the database management. In this embodiment, two external devices are used serially to, in effect, make up a single processing engine, but are independently connected to the processing engine interface.

The Methods of the Invention

As can be seen, the invention can make configuring an interface device to interface between a main processor and a processing engine quite simple. As explained above, at the time of the design of the interface device, the main processor has a message set and message format which are substantially fixed. Likewise, the main bus has a pin map and clock rate which are substantially fixed. However, at the time of the design of the interface device, the processing engine may be unknown, so the processing engine may have an operation code set and operand format which are unknown. Likewise, the processing engine bus may have a pin map and clock rate which are unknown.

According to a method of the invention described herein, variables of the processing engine (as discussed above) are stored and used by the interface device. The interface device sends decode messages from the main processor to the processing engine using the processing engine bus, in conformance with the processing engine pin map and the processing engine clock rate.

Figure 5:
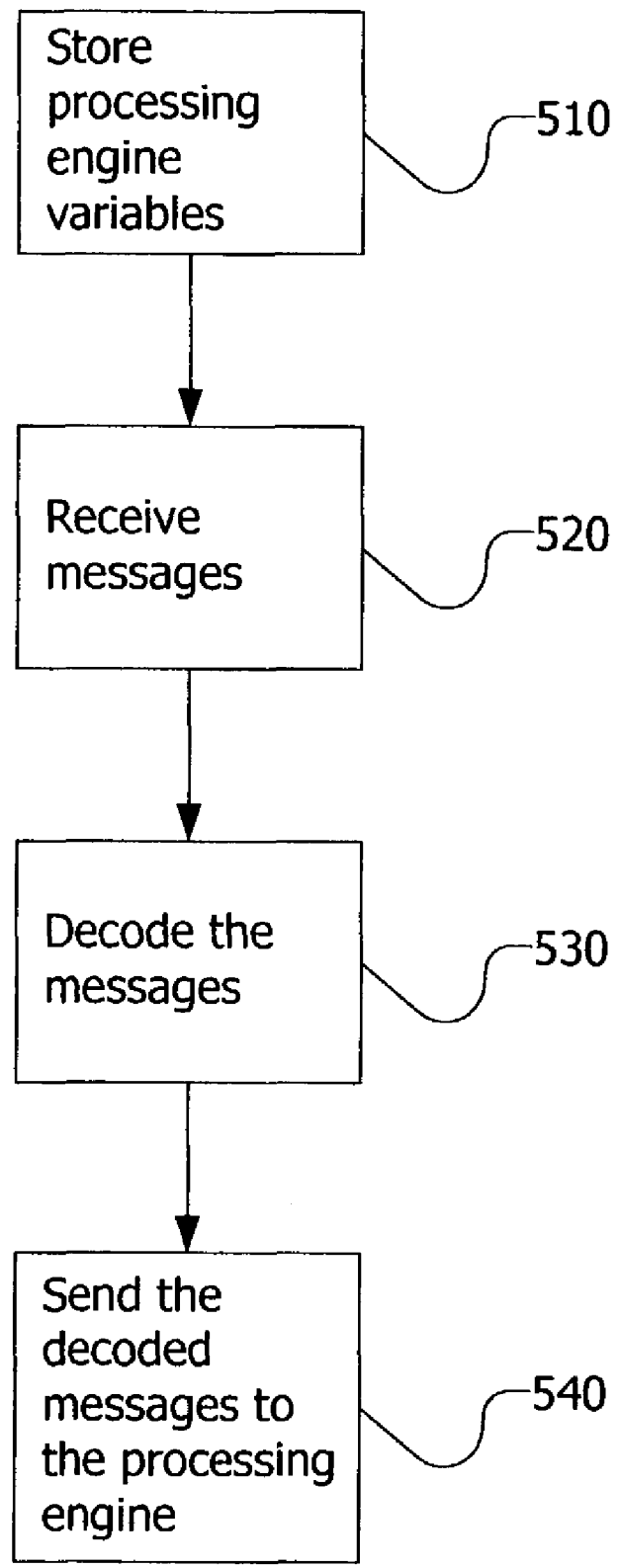
FIG. 5 is a flow chart of a method of operating an interface device in accordance with the invention.

Referring now to FIG. 5, there is shown a flow chart of a method of operating an interface device to interface between a main processor and a processing engine. Variables of the processing engine are stored (step 510).

The interface device receives messages from the main processor directed at the processing engine (step 520). These messages may specify multiple operations or lookups in a single message. The messages may specify a destination for a result, such as returning the result back to the main processor or to some another device (e.g., through pipe 358 in FIG. 3). The message may also specify that the results of a lookup are to be prepended to another lookup request, therefore implicating the stitcher 470 (FIG. 4).

The interface device decodes the messages (step 530). Decoding may include separating a given message into an instruction and an operand. Although instructions are said to be "translated" herein and operands are said to be "converted," it should be appreciated that this terminology is used to show that instructions and operands may be decoded using different techniques. However, instructions and operands may be decoded using identical techniques, and may be decoded together.

The interface device may translate the instructions to the operation code set of the processing engine. Translating instructions may comprise mapping the instruction to the operation code set of the identified processing engine.

The interface device may convert the operand to the format of the processing engine. Converting operands may comprise recognizing that the operand format of the processing engine is less than a maximum size, and filling appropriate bits of the operand so that the operand may be received properly by the processing engine when sent on the processing engine bus.

Next, the interface sends the decoded messages (i.e., translated operation codes and converted operands) to the processing engine (step 540).

The method of FIG. 5 can be seen to provide instruction indirection for the processing engines. The abstraction provided by the interface device allows the design of a network processor, line card or other apparatus to have a longer life and wider application. Thus, although the interface device of the invention may increase complexity and some costs in the short run, in the long run it can reduce complexity, speed implementation, lower costs and provide considerable flexibility.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. An interface device for interfacing a main processor and a processing engine, the interface comprising
    a settings storage to store variables of the processing engine, the variables including
        a translation of instructions into an operation code set of the processing engine
        a conversion of operands into a format of the processing engine
        a pin map of the processing engine
        a clock rate of the processing engine
    a main processor interface having a first pipe to couple to a first bus, the main processor interface to receive messages via the first bus from the main processor directed at the processing engine, wherein the first pipe has a fixed width, a fixed pin map and a fixed clock rate
    a decoder coupled to the settings storage to
        separate the messages into instructions and operands
        translate the instructions to the operation code set of the processing engine according to the translation variable stored in the settings storage
        convert the operands to the format of the processing engine according to the conversion variable stored in the settings storage
    a processing engine interface having a second pipe to couple to a second bus, the processing engine interface to send translated operation codes and converted operands via the second bus to the processing engine, wherein the second pipe has a configurable pin map and a configurable clock rate to be used in conformance with the processing engine pin map and the processing engine clock rate.

2. The interface device of claim 1 wherein the decoder is further for configuring the processing engine interface to use the second pipe in conformance with the processing engine pin map and the processing engine clock rate.

3. The interface device of claim 1 further comprising a host processor interface coupled to the settings storage, the processing engine interface and a third pipe, the third pipe to couple to a third bus coupled to a host processor, wherein the third pipe has a fixed width, a fixed pin map and a fixed clock rate.

4. The interface device of claim 3, the host processor interface to receive third messages via the third pipe from the host processor for configuring the processing engine.

5. The interface device of claim 3, the host processor interface to receive third messages via the third pipe from the host processor for storing variables of the processing engine in the settings storage.

6. The interface device of claim 3, the host processor interface to receive third messages via the third pipe from the host processor for maintaining, initializing and debugging the processing engine.

7. The interface device of claim 1 wherein the main processor interface comprises a DMA interface.

8. The interface device of claim 7 wherein
the DMA interface includes the first pipe and the first pipe comprises a plurality of pipes
the DMA interface further includes a plurality of first-in, first-out memories (FIFOs) and an arbiter, the arbiter for directing messages from the plurality of pipes to the plurality of FIFOs based upon respective availability in the plurality of FIFOs for more messages.

9. The interface device of claim 8 wherein there is a one-to-one correspondence between the plurality of pipes and the plurality of FIFOs.

10. The interface device of claim 7 wherein the main processor interface comprises a fetcher comprising a plurality of register files and a controller for extracting instructions and data from the messages in the register files.

11. The interface device of claim 1 wherein the processing engine comprises a classifier engine, the interface further comprising a stitcher for prepending search results from the processor engine to instructions.

12. The interface device of claim 1 wherein the settings storage comprises a plurality of registers.

13. The interface device of claim 1 wherein the processing engine is selected from the group consisting of a single high speed and high density classifier engine, plural identical classifier engines, plural non-identical classifier engines, a classifier engine to receive its instruction through its data bus, a classifier engine to receive its operations code separate through its message data, a streaming pipelined memory, a content addressable memory (CAM), a ternary CAM, and a CAM with context SRAM.

14. The interface device of claim 1 wherein the interface device is included in an integrated circuit chip.

15. The interface device of claim 14 wherein the integrated circuit chip further comprises a DMA engine coupled to the interface device.

16. The interface device of claim 14 wherein the integrated circuit chip is included in a line card.

17. The interface device of claim 16 wherein the line card further comprises the main processor, a DMA engine coupled to the interface device, a host processor coupled to the interface device via a third bus, and the processing engine.

18. The interface device of claim 17 wherein the main processor and the DMA engine are on the integrated circuit chip.

19. The interface device of claim 16 wherein the processing engine comprises two processing engines, the interface device adapted for interfacing the main processor to the two processing engines independently and in parallel.

20. The interface device of claim 14 wherein the integrated circuit chip is included in a network device.

21. A method of configuring an interface device, the interface device for interfacing a main processor and a processing engine, the method comprising
providing the interface device, the interface device comprising a main processor interface and a processing engine interface
the main processor interface having a first pipe coupled to a first bus for receiving messages via the first bus from the main processor directed at the processing engine, wherein the first pipe has a fixed width, a fixed pin map and a fixed clock rate
the processing engine interface having a second pipe coupled to a second bus for sending translated instructions and converted operands via the second bus to the processing engine, wherein the second pipe has a configurable pin map and a configurable clock rate
storing variables of the processing engine, the variables including
a translation of instructions into an operation code set of the processing engine
a conversion of operands into a format of the processing engine
a pin map of the processing engine
a clock rate of the processing engine
using the second pipe in conformance with the processing engine pin map and the processing engine clock rate.

22. The method of claim 21 wherein a host processor, coupled to the interface device, provides the variables to the interface device.

23. The method of claim 21 further comprising a host processor, coupled to the interface device, to send messages to the interface device to configure the processing engine.

24. A method of operating an interface device, the interface device for interfacing a main processor and a processing engine, the method comprising
storing variables of the processing engine, the variables including
a translation of instructions into an operation code set of the processing engine
a conversion of operands into a format of the processing engine
a pin map of the processing engine
a clock rate of the processing engine
receiving messages via a first pipe in the interface device from the main processor directed at the processing engine, wherein the first pipe has a fixed width, a fixed pin map and a fixed clock rate
decoding the messages by
separating the messages into instructions and operands
translating the instructions to the instruction set of the processing engine according to the translation variable stored in the settings storage
converting the operands to the format of the processing engine according to the conversion variable stored in the settings storage
sending the translated operation codes and the converted operands via a second pipe in the interface device to the processing engine, wherein the second pipe has a configurable pin map and a configurable clock rate and is configured in conformance with the processing engine pin map and the processing engine clock rate.

25. The method of claim 24 wherein the step of receiving messages via a first pipe comprises receiving messages via a plurality of pipes into an arbiter, the arbiter directing messages from the plurality of pipes to a plurality of first-in, first-out memories (FIFOs).

26. The method of claim 25, wherein the arbiter directs messages to the FIFOs based upon respective availability in the plurality of FIFOs for more messages.

27. The method of claim 24 further comprising
receiving results from the processing engine
prepending the results from the processing engine to instructions.

28. An interface device for interfacing a main processor and a plurality of processing engines, the interface device comprising
a settings storage to store variables of the processing engines, respectively, the variables including a translation of instructions into an operation code set of the processing engine a conversion of operands from into a format of the processing engine a pin map of the processing engine a clock rate of the processing engine a main processor interface having a first pipe to couple to a first bus, the main processor interface to receive messages via the first pipe from the main processor directed at the processing engines, wherein the first pipe has a fixed width, a fixed pin map and a fixed clock rate, the main processor interface further to identify which of the processing engines should receive the messages a decoder coupled to the settings storage to separate messages from the main processor into instructions and operands translate the instructions from the instruction set of the main processor to the instruction set of the identified processing engine according to the translation variable stored in the settings storage for the identified processing engine convert the operand from the format of the main processor to the format of the identified processing engine according to the conversion variable stored in the settings storage for the identified processing engine a processing engine interface having plural second pipes to respectively coupled to plural second buses, the processing engine interface to send translated operation codes and converted operands via the second buses to the identified processing engines, wherein the second pipes have configurable pin maps and configurable clock rates configurable to be used in conformance with the processing engine pin map and the processing engine clock rate for the respective processing engines.

29. The interface device of claim 28 wherein the decoder includes logic for independently and in parallel separating, translating and converting the messages for the respective processing engines.

30. The interface device of claim 28 wherein the main processor interface is further to identify which of the processing engines should receive each message based upon how busy the processing engines are.

31. The interface device of claim 28 wherein the decoder is further to configure the processing engine interface to use the second pipes in conformance with the processing engine pin maps and the processing engine clock rates.

32. The interface device of claim 28 wherein the processing engines are identical.

33. The interface device of claim 28 wherein the processing engines are different.

34. The interface device of claim 33 wherein the integrated circuit chip is included in a line card.

35. The interface device of claim 34 wherein the integrated circuit chip further comprises the main processor a DMA engine coupled to the interface device via the first bus, and the processing engines.

36. The interface device of claim 35 wherein the main processor and the DMA engine are on the integrated circuit chip.

37. The interface device of claim 28 wherein the interface device is included in an integrated circuit chip.

38. The interface device of claim 37 wherein the integrated circuit chip is included in a network device.

39. A method of operating an interface device, the interface device for interfacing a main processor and a plurality of processing engines, the method comprising storing variables of the processing engines, the variables respectively including a translation of instructions into an operation code set of the processing engine a conversion of operands into a format of the processing engine a pin map of the processing engine a clock rate of the processing engine receiving messages via a first pipe in the interface device from the main processor, wherein the first pipe has a fixed width, pin map and clock rate identifying which of the processing engines should receive the messages decoding the messages by separating the messages into instructions and operands translating the instructions to the operation code set of the identified processing engine according to the translation variable stored in the settings storage for the identified processing engine converting the operands to the format of the identified processing engine according to the conversion variable stored in the settings storage for the identified processing engine sending the translated operation codes and the converted operands via plural second pipes in the interface device to the identified processing engines, wherein the second pipes have configurable pin maps and configurable clock rates and are configured in conformance with the processing engine pin map and the processing engine clock rate of the respective processing engines.

40. The method of claim 39 wherein the step of receiving messages via a first pipe comprises receiving messages via a plurality of pipes into an arbiter, the arbiter directing messages from the plurality of pipes to a plurality of first-in, first-out memories (FIFOs).

41. The method of claim 40, wherein the arbiter directs messages to the FIFOs based upon respective availability in the plurality of FIFOs for more messages.

42. The method of claim 39 further comprising receiving results from the processing engine to the translated instructions and the converted operands prepending the results from the processing engine to a prior result from the processing engine.

43. The method of claim 39 further comprising independently and in parallel separating, decoding the messages for the respective processing engines.

44. The method of claim 39 wherein the identifying step comprises determining how busy the processing engines are and selecting a one of the processing engines based upon how busy the processing engines are.

* * * * *